United States Patent
Wildhaber

[11] 3,778,129
[45] Dec. 11, 1973

[54] OPTICAL SCANNER

[76] Inventor: Ernest Wildhaber, 124 Summit Dr., Rochester, N.Y. 14620

[22] Filed: Aug. 31, 1972

[21] Appl. No.: 285,515

[52] U.S. Cl. ............ 350/6, 178/7.6, 250/236, 352/115, 95/4.5
[51] Int. Cl. ............................................. G02b 17/00
[58] Field of Search............ 350/6, 7, 285, 273–275; 250/219, 235, 236; 178/7.6; 356/23–26; 352/89, 114–118; 95/4.5; 340/146.3

[56] References Cited
UNITED STATES PATENTS
| | | | |
|---|---|---|---|
| 3,591,249 | 1/1969 | Wildhaber | 350/6 |
| 3,602,571 | 8/1971 | Norris | 350/7 |
| 3,602,572 | 8/1971 | Norris | 350/7 |

Primary Examiner—David Schonberg
Assistant Examiner—Michael J. Tokar
Attorney—B. Edward Shlesinger

[57] ABSTRACT

This optical scanner uses a rotor with lenses. The lens surfaces are special and made up of surface elements parallel to the rotor axis. Preferably the source of light is a laser emitting very nearly parallel light rays. The rays are directed through a narrow line-like area that may lie on the rotor axis, and that emits a narrow fixed light bundle. A rotor lens forms an image of said line-area on a record. The thus illuminated area moves along a character line of the record as the rotor turns. To cover the entire length of a line of characters with the fixed narrow light bundle, the lens profile in a plane perpendicular to the rotor axis has a varying curvature. Its curvature radius is smallest in the midportion. The light reflected from the illuminated record area is gathered by a stationary elongated lens that extends along a plane perpendicular to the rotor axis at a constant distance from the record surface. This elongated lens has a portion, such as an opening, adapted to let the incoming light through without alteration. The reflected light passing through said elongated lens and through the adjacent lens of the rotor reaches a photocell.

12 Claims, 13 Drawing Figures

PATENTED DEC 11 1973 3,778,129

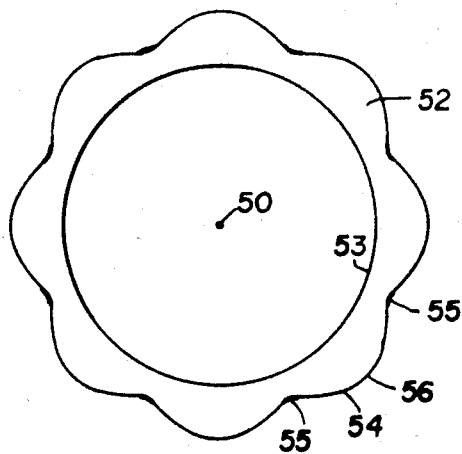
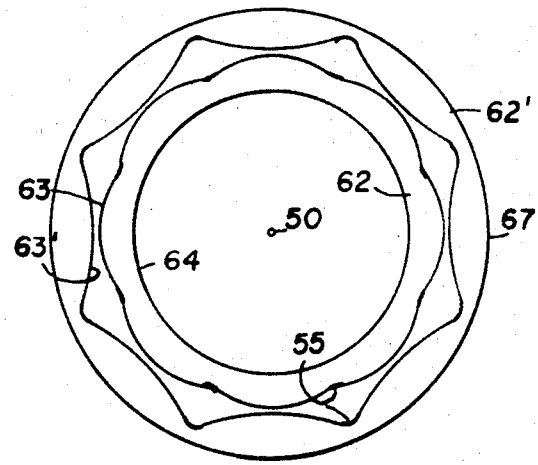
FIG. 9  FIG. 11
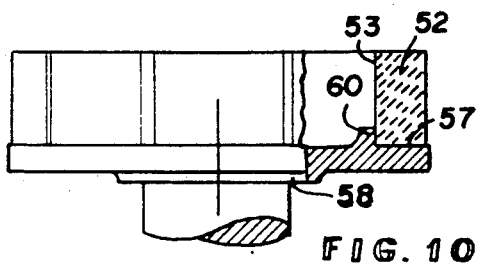
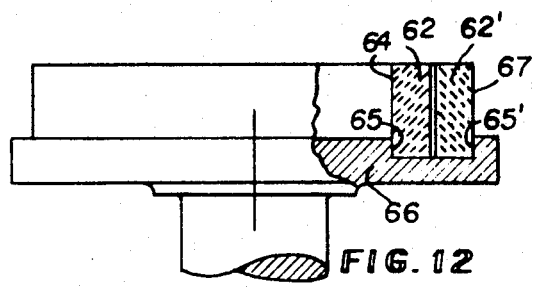
FIG. 10  FIG. 12
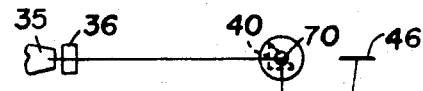
FIG. 13
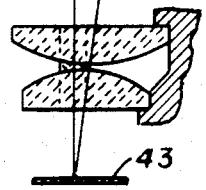

OPTICAL SCANNER

One object of the present invention is to provide a simplified and efficient apparatus for optically scanning lines of characters provided on a record.

A further object is to do this with line-scanning, illuminating at each instant a line-like area that extends in the direction of the character height and moves along a line of characters. A further aim is to apply this to bar codes, where the characters are bars.

Another aim is to gather a much larger amount of light reflected from the line-like illuminated record area than hitherto possible.

Another object is to provide a simplified rotor having its lenses formed on a one-piece refractory ring secured to the rotor, where the lens surfaces are composed of surface elements parallel to the rotor axis, so that parallel planes perpendicular to the rotor axis intersect said ring in identical profiles.

A still other aim is to provide a stationary elongated lens adjacent the record, for gathering much of the reflected light.

Other objects will appear in the course of the specification and in the recital of the appended claims.

The invention will be described with the drawings, in which

FIG. 9 is a view of a refractory ring with lenses, taken axially of the rotor.

Fig. 10 is a front view and partly an axial section corresponding to FIG. 9.

Fig. 11 is a view of a pair of coaxial refractory rings, taken axially of the rotor, and representing a modification of the embodiment shown in FIGS. 9 and 10.

FIG. 12 is a front view and partly an axial section corresponding to FIG. 11.

FIG. 13 is a diagram representing essentially FIG. 5 with a slight addition, in that prism 40 is pivotable.

Figure 1:
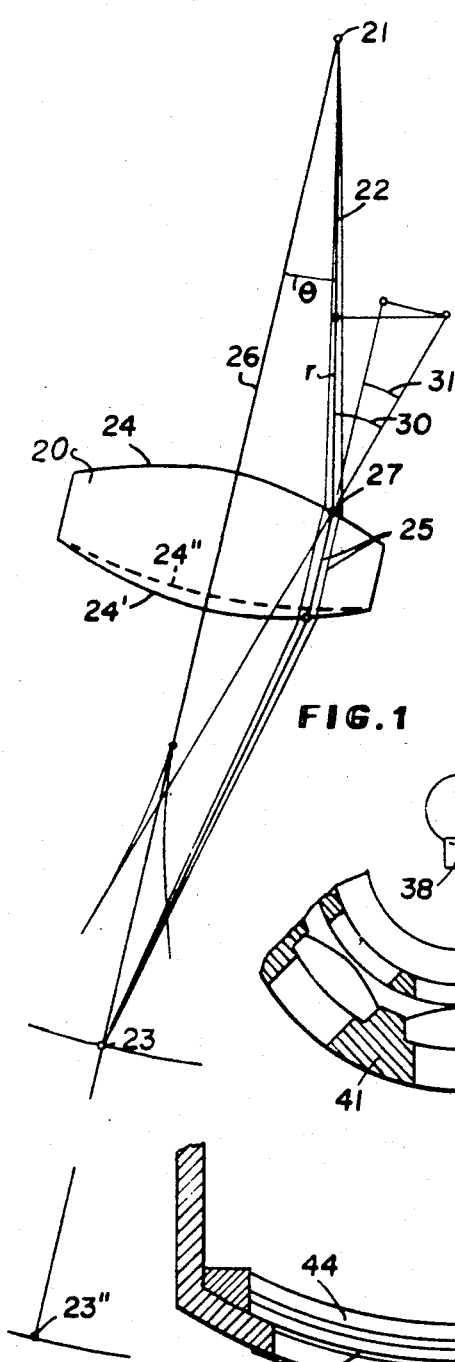
FIG. 1 is a view of the special lens of a rotor, taken along the rotor axis, and a diagram explanatory of the invention.

Lens 20, FIG. 1, is secured to a rotor with axis 21. Its working surfaces are preferably made up of surface elements parallel to the rotor axis 21. Fixed light bundle 22 comes from a narrow line-like area shown here coinciding with axis 21. It is directed to a similar line-like area 23 on the record, the image formed by lens 20. To accomplish this for a wide range of turning angles the lens profiles 24, 24' are non-circular. They lie in the plane of the drawing, a plane at right angles to axis 21. They can be computed with the known requirements of refraction.

Such computation is simplified when ray-lines 25 inside the lens body are kept parallel to axial plane 26, which is a plane of symmetry of lens 20.

The polar equation of lens profile 24, based on origin 21 and on angles $\theta$ between any radius vector $r = 21-27$ and plane 26 can then be derived as $$r = r_o(n-1)/(n \cos \theta - 1)$$

where $n$ denotes the index of refraction; and $r_o$ is the radius in plane 26.

Profile 24' is symmetrical to profile 24 and has the same equation, when based on origin 23.

Profiles 24, 24' provide a 1:1 size ratio between original and image, applying to the width. Other size ratios are attainable by using other origins. The dotted lens profile 24'' corresponds to an origin 23'' at a larger distance from lens 20.

The law of refraction states that the incident ray, the refracted ray and the surface normal lie in a common plane, and that the sine of the angles (30, 31, FIG. 1) between said rays and the surface normal are in a constant proportion at a given wave length, the proportion being the index of refraction $n$. It can be demonstrated mathematically that this law applies also to projection. It applies as well to projected rays that are inclined to the drawing plane of FIG. 1.

Figures 2, 3, 4:
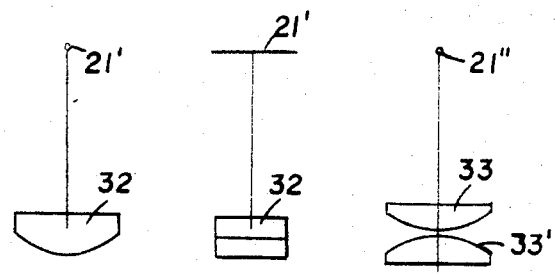
FIGS. 2 and 3 are an axial view and a corresponding side view of a modified form of lens of the rotor, at a smaller scale.
FIG. 4 is an axial view of a further form of lenses.

If desired, other lenses may be substituted for lens 20, as shown at a smaller scale in FIGS. 2, 3 and 4. Lens 32 of FIG. 2 and FIG. 3 has a plane inner surface and a much curved outer surface, composed of surface elements parallel to rotor axis 21'. FIG. 4 shows a pair 33, 33' of lenses with their convex profiles facing each other. Their curved-profile surfaces are also made up of surface elements parallel to their rotor axis 21''. They are cylindrical surfaces in the wider meaning of the term, not confined to circular profiles.

The profiles of the described rotor lenses have a varying curvature in planes at right angles to the rotor axis. The curvature radius is smallest in the mid-portion of a lens, for instance in plane 26, FIG. 1. While I prefer continuous smooth lens profiles, the profiles could also be split up in known saw-tooth like manner, if desired.

At a circular profile, the sine function of the inclination angle of the profile normals to the mid-plane (such as 26, FIG.1) would be proportional to the distance of a considered profile point from said plane. On the profiles here used the sine function of the inclination angle increases at a slower rate than said distance.

Figures 5, 6:
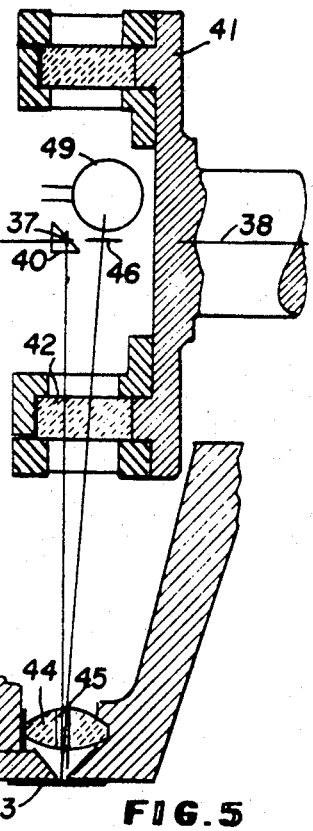
FIG. 5 is a fragmentary axial section of a scanner constructed according to the present invention.
FIG. 6 is a section corresponding to FIG. 5 and taken at right angles to the rotor axis.

FIGS. 5 and 6 show fragmentarily a scanner using lenses of the type described with FIGS. 1 to 4. Essentially parallel rays of a laser 35, or laser assembly, pass through a cylindrical lens 36 to form a line-image passing through point 37 on the rotor axis 38, at least approximately. The lenses 42 of rotor 41 direct the ray bundle to the record 43, forming an image thereon of the line of light at point 37. As the rotor turns on its axis the illuminated line-like area moves along the circular scanning line 39, FIG.6.

Light reflected from the illuminated record area is gathered by a stationary elongated and arcuate lens 44, that contains a slot 45 to let the light from prism 40 pass to the record without passing through the body of the lens 44.

Lens 44 extends along a plane perpendicular to the rotor axis 38 at a constant distance from the record 43 and from the adjacent surface that supports it. Said plane intersects lens 44 in equidistant lines, here specifically in circular arcs 44₀, 44, concentric with the rotor axis.

Lens 44 is slightly offset axially of the rotor, so that the reflected light bypasses prism 40 after passing through rotor lens 42. A lengthwise enlarged image of the illuminated line-like record area is formed at 46. It is formed through the cooperation of cylindrical lens 42 and elongated lens 44, that acts substantially like a cylindrical lens set crosswise to cylindrical lens 42.

From region 46 the rays pass to a photocell 49 that converts the light fluctuations into fluctuations of electric current for suitable transmission.

Figure 7:
FIG. 7 is a cross-section of a modified elongated lens, such as might be substituted for lens 44 shown in FIGS. 5 and 6.

In place of a lens 44 a lens 44', FIG.7, may be used if desired. It differs from lens 44 only by avoiding slot 45 and replacing it with parallel flat portions 45' that let laser light from prism 40 pass like going through a window pane.

The small cylindrical lens 36, FIG. 5, keeps the height of the illuminated record area nearly equal to the height of the laser beam, on lasers emitting essentially parallel light rays. Any desired other height may be achieved by substituting other lenses for lens 36.

Figure 8:
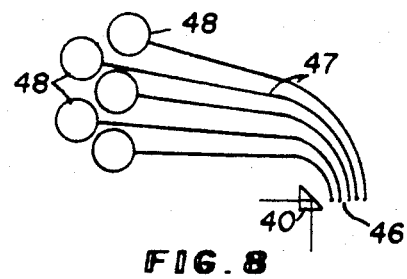
FIG. 8 is a diagram showing a way of splitting up line 46 of FIG. 5 into a series of points and transmitting their light fluctuations individually to different photocells.

The described embodiment uses a bar code on the record, composed of bars approximately at right angles to the character lines, within from zero to about five degrees. However it is not necessarily confined to the use of a bar code, but can also be adapted to direct alpha-numeric reading, as shown in FIG.8. Light at different points of line image 46 is directed with fiber optics 47 to different photocells 48. Any number of points may be used.

The record may be displaced in conventional manner, either uniformly at a slight angle to the direction of the rotor axis, or intermittently at zero angle thereto.

FIGS.9 to 12 show rotors operating on the same described principle, but containing one-piece refractory rings on which lens surfaces are formed. The lens surfaces are here also made up of straight-line surface elements parallel to the rotor axis. The axis 50 of each ring coincides with the axis of the rotor. Such rotors may be substituted for rotor 41 shown in FIGS.5 and 6.

Refractory ring 52 (FIGS.9 and 10) contains an inner cylindrical surface 53 and convex outer profiles 54. The junctures of adjacent outer profiles are made opaque with suitable layers 55. Convex profiles 54 have a varying curvature, the curvature radius being smallest at the mid-portion 56 of each lens.

Ring 52 rests on a plane face 57 of rotor 58 and may be bonded thereto. It is centered by a circular shoulder 60 that engages cylindrical surface 53.

The aligned refractory rings 62, 62', FIG.11, have convex profiles 63, 63' facing each other. Ring 62 contains an inside cylindrical surface 64 that abuts a circular shoulder 65 of the body of rotor 66. Ring 62' contains an outside cylindrical surface 67 that rests against a circular shoulder 65' of rotor 66.

The lens surfaces may be ground with a grinding wheel whose axis lies in a plane perpendicular to the rotor axis. Relative reciprocation is provided in the direction of the rotor axis. The workpiece is indexed from time to time, setting in periodically. If desired, a final grind or lapping action may be had with a plane end face-type wheel, while displacing the wheel in the grinding plane for fine finish. Also with plastic refractory material, as for instance Lucite, the shape may be molded.

One problem in scanning is the alignment of the record. In one procedure care is taken that the record lines are in the prescribed direction, that a line is in a prescribed position, and that the accumulated distance of the lines is kept within a narrow tolerance.

Another procedure is less exacting but requires an automatic correction in the scanner.

Diagram FIG.13 shows a way of correction. The general procedure is like that described with FIGS.5 and 6. Here however the prism 40 is not fixed. It can pivot about a pin 70. This will displace the lighted record area in the direction of the rotor axis. The amount of correction needed is controlled by a sensor, (not shown). It should be noted that the pivoted prism has very little inertia and can provide the required moderate correction very rapidly.

While the invention has been described with several different embodiments thereof, it will be understood that it is capable of further modification, and that this application is intended to cover any variations, uses, or adaptations of the invention following, in general, the principles of the invention and including such departures from the present disclosure as come within known or customary practice in the art to which the invention pertains and as fall within the scope of the invention or the limits of the appended claims.

What I claim is:

1. An optical scanner comprising
laser means adapted to emit approximately parallel light rays,
a rotor,
stationary means for directing said light rays through a narrow line-like area extending approximately in the direction of the rotor axis,
a plurality of lens surfaces provided on said rotor at a constant distance from its axis,
each lens surface being composed of surface elements parallel to the rotor axis and being symmetrical to an axial plane of said rotor,
a surface for supporting a record,
said lens surfaces being adapted to form an image on the record of said line-like area of light, whereby said image moves on the record as the rotor turns,
a stationary lens of convex cross-sectional profile extending along a plane perpendicular to the rotor axis at a constant distance from said supporting surface, for gathering light reflected from the record and for forming, together with a rotor lens, an image of lighted record area,
and photocell means placed adjacent said image.

2. An optical scanner according to claim 1, wherein said stationary line-like area of light is at the rotor axis at least approximately,
said surface for supporting a record is a cylindrical surface whose axis is approximately aligned with the rotor axis.

3. In an optical scanner,
light means adapted to emit light from a narrow line-like area,
a rotor containing a lens for projecting said light to a record, to illuminate a narrow area thereof that moves on the record as the rotor turns,
said lens having a working surface made up of straight-line surface elements parallel to the rotor axis.

4. In an optical scanner the combination according to claim 3, wherein said light means is a laser assembly.

5. In an optical scanner the combination according to claim 3,
wherein said lens extends on both sides of an axial plane of said rotor,
the surface normals of said straight-line elements are increasingly inclined to said axial plane with increasing distance of said elements therefrom, so that the sine function of the inclination angle increases at a slower rate than said distance.

6. In an optical scanner, the combination according to claim 3, wherein the rotor contains a plurality of lenses equally spaced about the rotor axis at a constant distance therefrom.

7. In an optical scanner, the combination according to claim 3, wherein the profile of said working surface, in a plane perpendicular to the rotor axis, is a smooth continuous curve convexly curved at a varying curvature,
the curvature radius being smallest at the mid-portion of said lens.

8. In an optical scanner,
a rotor,
a refractory ring-shaped part coaxial with said rotor,
said part containing a plurality of lens surfaces equally spaced about the rotor axis,
said lens surfaces being made up of straight-line elements parallel to the rotor axis.

9. In an optical scanner, the combination according to claim 8, wherein one of the side surfaces of said ring-shaped part is a cylindrical surface coaxial with said rotor.

10. In an optical scanner,
a light source,
a surface for supporting a record,
a rotor for projecting light of said source to a record on said surface, whereby the lighted area moves on said record as said rotor turns,
and means for gathering light reflected from the illuminated record area for transmission to a photocell,
said means comprising an elongated stationary lens extending along a plane perpendicular to the rotor axis at a constant distance from said surface,
opposite working surfaces of said lens intersecting said plane in equidistant lines.

11. In an optical scanner, the combination according to claim 10,
wherein opposite working surfaces of said elongated lens intersect said plane perpendicular to the rotor axis in circular arcs concentric with the rotor axis.

12. An optical scanner comprising
a rotor containing a plurality of lenses spaced in a circle about its axis,
said lenses having a convex profile of varying curvature at least in the peripheral direction of said rotor, being most curved in the central lens portion,
means for supporting a record,
a laser adapted to emit a bundle of light,
means for directing the light of said laser in a fixed path to said lenses as they move within reach of said light and thence to said record along a scanning line,
and means for directing light reflected from the illuminated record areas to light-sensitive means for controlling an electric current, to cause the electric current to vary in accordance with the light received.

* * * * *